(12) United States Patent
VanBlon et al.

(10) Patent No.: US 9,966,079 B2
(45) Date of Patent: May 8, 2018

(54) DIRECTING VOICE INPUT BASED ON EYE TRACKING

(71) Applicant: LENOVO (Singapore) PTE, LTD., New Tech Park (SG)

(72) Inventors: Russell Speight VanBlon, Raleigh, NC (US); Manisha Bijjaragi, Mebane, NC (US); Jason Grimme, Cary, NC (US); Spencer Michael Guy, Raleigh, NC (US); Kyle Jared McDaniel, Morrisville, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 283 days.

(21) Appl. No.: 14/223,762

(22) Filed: Mar. 24, 2014

(65) Prior Publication Data
US 2015/0269943 A1    Sep. 24, 2015

(51) Int. Cl.
| | |
|---|---|
| *G10L 17/22* | (2013.01) |
| *G06F 3/16* | (2006.01) |
| *G06F 3/0481* | (2013.01) |
| *G06F 3/01* | (2006.01) |
| *G06K 9/00* | (2006.01) |
| *G10L 15/22* | (2006.01) |

(52) U.S. Cl.
CPC .............. *G10L 17/22* (2013.01); *G06F 3/013* (2013.01); *G06F 3/017* (2013.01); *G06F 3/0481* (2013.01); *G06F 3/167* (2013.01); *G06K 9/00288* (2013.01); *G06K 9/00604* (2013.01); *G10L 2015/226* (2013.01)

(58) Field of Classification Search
CPC ........................................................ G10L 15/24
See application file for complete search history.

(56) References Cited

U.S. PATENT DOCUMENTS

| | | | | |
|---|---|---|---|---|
| 5,884,249 | A * | 3/1999 | Namba | G06F 17/271 704/275 |
| 6,545,669 | B1 * | 4/2003 | Kinawi | G06F 3/0486 345/1.1 |
| 6,795,806 | B1 * | 9/2004 | Lewis | G06F 3/167 704/260 |
| 6,970,824 | B2 * | 11/2005 | Hinde | G10L 15/24 382/103 |

(Continued)

FOREIGN PATENT DOCUMENTS

| | | | |
|---|---|---|---|
| CN | 101866215 A | 10/2010 | |
| EP | 0718823 A2 | 6/1996 | |
| EP | 2806335 A1 * | 11/2014 | ........... B60R 16/231 |

OTHER PUBLICATIONS

Klawonn, Frank. Introduction to computer graphics: using Java 2D and 3D. Springer Science & Business Media, 2008.*

(Continued)

*Primary Examiner* — Brian L Albertalli
(74) *Attorney, Agent, or Firm* — Kunzler, PC

(57) ABSTRACT

For directing voice input based on eye tracking, a method is disclosed that includes receiving, by use of a processor, an audio signal, the audio signal comprising voice input, selecting a location from the group consisting of a computing device and an application being displayed on a screen of the computing device, the location being detected where a user's eyes are directed, and directing the voice input to the selected location.

11 Claims, 10 Drawing Sheets

(56) References Cited

U.S. PATENT DOCUMENTS

| | | | |
|---|---|---|---|
| 7,219,062 B2* | 5/2007 | Colmenarez | G10L 15/24 382/100 |
| 8,571,851 B1* | 10/2013 | Tickner | G06F 17/2785 704/1 |
| 2002/0135618 A1* | 9/2002 | Maes | G06F 3/0481 715/767 |
| 2003/0040914 A1* | 2/2003 | Friedrich | G06F 3/013 704/275 |
| 2004/0193413 A1* | 9/2004 | Wilson | G06F 3/017 704/243 |
| 2009/0110245 A1* | 4/2009 | Thorn | G03B 13/00 382/118 |
| 2010/0238280 A1* | 9/2010 | Ishii | B60K 35/00 348/77 |
| 2013/0021459 A1* | 1/2013 | Vasilieff | G10L 25/78 348/77 |
| 2013/0050258 A1* | 2/2013 | Liu | G02B 27/017 345/633 |
| 2013/0238320 A1* | 9/2013 | Johnston | G06F 17/2247 704/9 |
| 2013/0307771 A1* | 11/2013 | Parker | G06F 3/013 345/158 |
| 2013/0314303 A1* | 11/2013 | Osterhout | G06F 3/005 345/8 |
| 2013/0325453 A1* | 12/2013 | Levien | G10L 21/00 704/201 |
| 2014/0176813 A1* | 6/2014 | Conness | H04N 5/60 348/738 |
| 2014/0184550 A1* | 7/2014 | Hennessey | G06F 3/013 345/173 |
| 2014/0337740 A1* | 11/2014 | Kwon | G06F 3/04817 715/728 |
| 2014/0354533 A1* | 12/2014 | Swaminathan | G06F 3/013 345/156 |
| 2015/0019227 A1* | 1/2015 | Anandarajah | G10L 15/22 704/257 |
| 2015/0109191 A1* | 4/2015 | Johnson | G10L 15/22 345/156 |
| 2015/0154001 A1* | 6/2015 | Knox | G06F 3/167 345/156 |

OTHER PUBLICATIONS

Beach, Glenn, et al. "Eye tracker system for use with head mounted displays." Systems, Man, and Cybernetics, 1998. 1998 IEEE International Conference on. vol. 5. IEEE, 1998.*

Command button. (2003). In B. Pfaffenberger, Webster's new World&Trade; Computer Dictionary (10th ed.). Boston, MA: Houghton Mifflin Harcourt. Retrieved from http://search.credoreference.com/content/entry/webstercom/command_button/0?institutionId=743.*

* cited by examiner

DIRECTING VOICE INPUT BASED ON EYE TRACKING

BACKGROUND

Field

The subject matter disclosed herein relates to verbally commanding mobile computing devices and more particularly relates to directing voice input based on eye tracking.

Description of the Related Art

In general, computing devices are becoming more capable of receiving and processing voice input. Computing devices may execute many application that are capable of understanding voice commands, or converting spoken words to application commands.

In computing devices that may be executing more than one application capable of receiving and processing voice input, it can be challenging to direct voice input to one application, but not another. For example, where a computing device may be executing two distinct application that may receive voice input, when the computing device receives voice input the computing device may not know which application is to receive the input.

In one example, a user may remove one application from view and the computing device may direct voice input to the application that is still viewable however, this is cumbersome for a user and limits the user to viewing one application at a time.

In another example, although a computing device may receive voice input, the command heard by the computing device may or may not be meant for that computing device. This may cause computing devices to unexpectedly execute commands based on received voice input that is meant for other purposes, such as users speaking to other users, or to other devices.

In another example, an application may provide buttons to start, stop, record, or pause for voice input. In this example, a user may press start via the application, and the user may speak to the computing device. If the user desires to speak for another purpose, the user must typically press the pause button to stop the computing device from interpreting the other speech. After the user is finished with the other speech, the user may press the pause button again and continue speaking to the computing device. Requiring a user to use such buttons wastes time and makes the voice interface to the computing device inefficient and complex.

BRIEF SUMMARY

An apparatus for directing voice input based on eye tracking is disclosed. In one embodiment, the apparatus includes a processor and memory that stores code executable by the processor. In one embodiment, the code includes receives an audio signal, the audio signal comprising voice input, code that selects a location from the group consisting of a computing device and an application being displayed on a screen of the computing device, the location being detected where a user's eyes are directed, and code that directs the voice input to the selected location A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
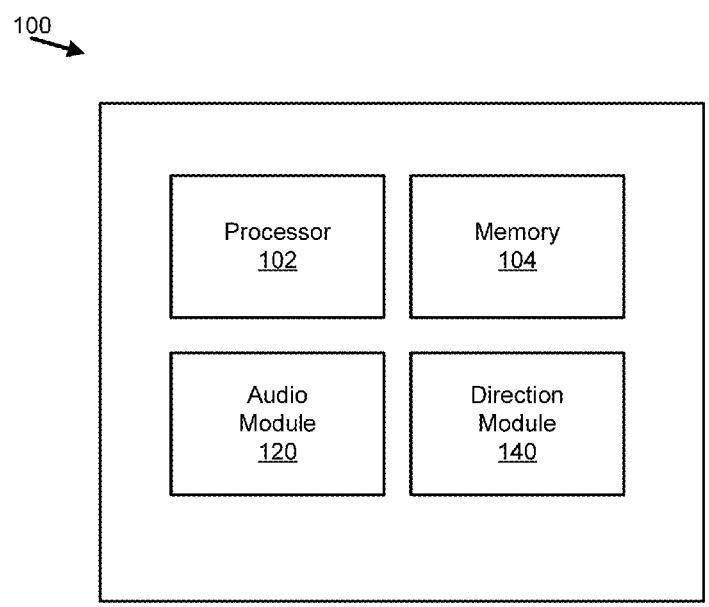
FIG. 1 is a schematic block diagram illustrating one embodiment of an apparatus for directing voice input based on eye tracking.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment 100 of an apparatus for directing voice input based on eye tracking. In one embodiment, the apparatus may include a processor 102, a memory 104, an audio module 120 and a direction module 140.

In one embodiment, the apparatus 100 includes a processor 102. A processor as described herein may include any kind of microprocessor capable of executing executable code. The processor 102 may also implement any available instruction set, including, but not limited to, CISC, RISC, or other, or the like, as one skilled in the art may appreciate.

In one embodiment, the apparatus 100 may include a memory 104 that stores code executable by the processor. The memory 104 may include any memory capable of storing executable code. In certain examples, the memory may include volatile memory, non-volatile memory, or other, or the like. In another embodiment, the memory 104 may be a storage device as previously described. In a further embodiment, the memory 104 may store executable code that performs functions of one or more modules described herein.

In one embodiment, the apparatus 100 includes the audio module 120. In one embodiment, the memory 104 may store executable code that receives an audio signal, or performs other functions of the audio module 120. In one example, the audio module 120 may receive an audio signal via a microphone or other audio sensor capable of converting sound waves to electronic signals. In another example, the audio module 120 may receive an audio signal as part of a file on a storage device. In another examples, the audio module 120 may receive the audio signal over a network connection. Of course, one skilled in the art may appreciate other ways to transfer an audio signal to the apparatus 100, and this disclosure is not limited in this regard.

In one embodiment, the audio signal may include voice input. The voice input may be vocal commands received from a user, or other speaker at or near the apparatus 100. The voice input may be other words spoken by a user, or other, or the like. The voice input may be synthesized words by another computing device as one skilled in the art may appreciate.

In one embodiment, the audio module 120 may generate one or more commands that correspond to the voice input. The audio module 120 may forward the commands to the direction module 140 for further processing. In another embodiment, the audio module 120 may forward the audio signal to the direction module 140 for further processing. Therefore, in some examples, the audio module 120 may transmit commands based on the voice input to the direction module 140, while in other examples, the audio module 120 may simply forward the received voice input to the direction module 140.

In certain embodiment, the audio module 120 may function as part of an operating system for the apparatus 100. In other embodiments, the audio module 120 may function as an application being executed by the operating system for the apparatus 100.

In one embodiment, the apparatus 100 may include the direction module 140. In one embodiment, the direction module 140 may select an application being displayed on a screen, a display for the application being disposed at a location on the screen where a user's eyes are directed.

According to one embodiment, the apparatus 100 may concurrently display several applications on a display for the apparatus. A user may direct his/her eyes at a location on the display and the direction module 140 may determine the location. Therefore, in one example, an application may be disposed on the display at the location (i.e. where the user's eyes are directed). Therefore, the direction module 140 may determine an application whose display encompasses the location, and select that application.

In another embodiment, the direction module 140 may direct the voice input to the application that was selected, based on the location where the user's eyes may be directed. In one embodiment, the direction module 140 may be implemented as part of an operating system for the apparatus 100. In this embodiment, the direction module 140, as part of the operating system, may determine a location based on tracking eye movement of the user. In another embodiment, the direction module 140 may track features of a user's eyes to determine movement and locations as one skilled in the art may appreciate.

In one embodiment, the direction module 140 may determine that a user's eyes are directed away from a display for the apparatus 100. In this embodiment, the direction module 140 may fail to select an application where a user's eyes are directed. In response to the user's eyes being directed away from a display for the apparatus, the direction module 140 may discard the voice input. Therefore, in certain embodiments, the direction module 140 may accept voice input when a user's eyes are directed at the apparatus 100, and ignore voice input when a user's eyes are not directed at the apparatus 100.

In other embodiments, the direction module 140 may self-select based on a user's eyes being directed towards the apparatus 100. Self-selecting, as described herein may include the direction module 140 processing vocal commands in response to a user directing his/her eyes towards the apparatus 100. Because the direction module 140 may ignore vocal commands when the user's eyes are directed elsewhere, the direction module 140 may only respond to vocal commands when the user is currently looking at the apparatus 100. Therefore, the direction module 140 may select the apparatus 100 in response to the apparatus 100 being located where the user's eyes are directed, or in response to the apparatus 100 being located at the location of the user's eyes.

In one embodiment, the direction module 140 may generate one or more commands represented by the voice input. Therefore, in some embodiments, the direction module 140 may direct the receive voice input to the selected application, while in other embodiments, the direction module 140 may direct commands in the voice input to the selected application. In one embodiment, the direction module 140 may include a location of the location in the one or more commands being directed to the selected application. The indicated location may include coordinates, or other values that may indicate where the user's eyes may be directed. Therefore, in some embodiments, the selected application may receive both the voice input and a specific location on a display for the apparatus 100. This may allow the selected application to process the voice input with the additional information regarding the specific location of the user's eyes.

In certain embodiments, this may allow a user to direct his/her eyes towards a control being display on a display for the apparatus 100 and issue one or more verbal commands. In one example, the user may focus on a button and issue a "click" command. In this example, the audio module 120 may receive the vocal command and forward the audio input to the direction module 140. The direction module 140 may select the application because the user's eyes are directed at the application, and the application may receive the "click" command, and may determine the correct button to push based on the location where the user's eyes are directed. This may allow a user to simulate mouse or other pointer functionality using eye focus and vocal commands.

In certain embodiments, the user may temporarily look in another direction such that his/her eyes are no longer directed at the apparatus 100. According to one example, a user may look at the apparatus 100, issue vocal commands, and may subsequently look in another direction, such as to response to communications from another person. In this example, the apparatus 100 may process the vocal commands when the user was looking at the apparatus 100, but may subsequently ignore verbal commands that may or may not be intended for the apparatus (based on a location of a focal point of the user's eyes). This may allow a user to issue some commands to the apparatus 100 and other speech in other direction without the apparatus processing the voice input for other purposes.

In another embodiment, the direction module 140 may employ facial recognition to recognize the face of the user. In one embodiment, the direction module 140 may learn a user based on a training application, historical use, initial use during a setup period, or other, or the like, as one skilled in the art may appreciate. The direction module 140 may recognize the user and may process verbal commands in response to the user focusing on the apparatus 100. In one example, the direction module 140 may not recognize a face of the user and may not process verbal commands although the unrecognized user may focus his/her eyes towards the apparatus 100. This may provide enhanced security because only the recognized user may issue verbal commands to the apparatus 100.

In one embodiment, in response to selecting an application, the direction module may bring the selected application to the front of a display. This may cause the selected application to be displayed ahead of other applications. Therefore, according to one embodiment, a user may bring an application to focus based on focusing his/her eyes at the application. Therefore, in one example, the direction module 140 may simply direct the audio signal, or corresponding commands to the application that is the focus of a display for the apparatus 100.

In another embodiment, the direction module 140 may not alter a display state of an application, but may direct the audio input to the selected application without bring the application to a focus on the operating system. Therefore, a selected application may remain in a background of the display and may nevertheless receive voice input from a user. In one examples, the selected application may be minimized and an icon may be visible representing the minimized application. The user may focus his/her eyes on the representative icon and issue one or more verbal commands. For examples, the user may focus his/her eyes on the application and issue a "maximize" command. The direction module 140 may forward the command to the minimized application and the selected application may maximize. In another examples, the user may focus his/her eyes on the application and issue a "close" command. The direction module 104 may forward the close command to the selected application without bring the application to a primary focus for the operating system.

Figure 2:
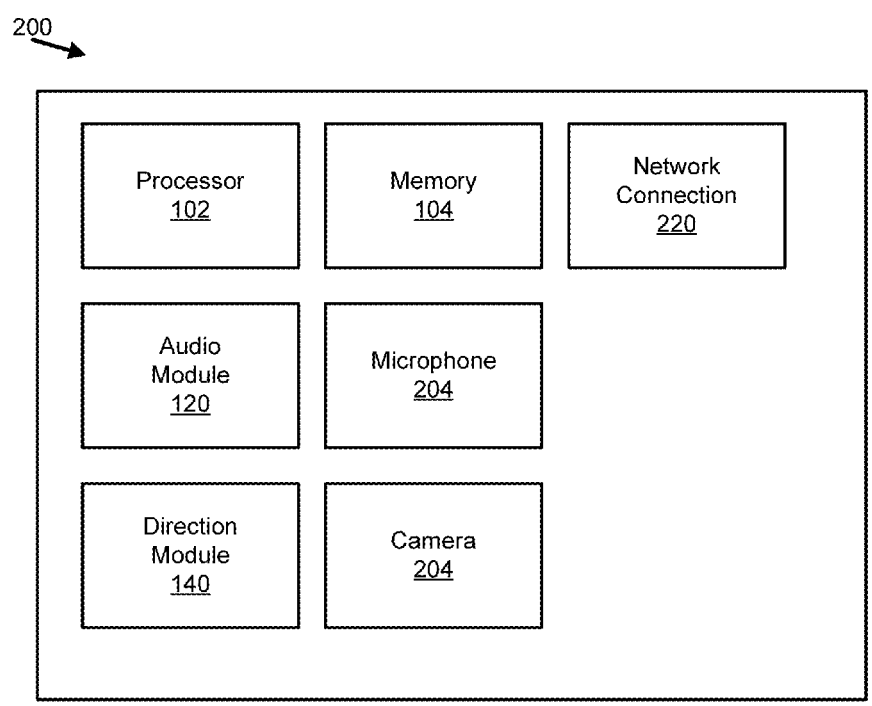
FIG. 2 is a schematic block diagram illustrating one embodiment of an apparatus for directing voice input based on eye tracking.

FIG. 2 is a schematic block diagram illustrating one embodiment of an apparatus 200 for directing voice input based on eye tracking. In one embodiment, the apparatus includes the processor 102, the memory 104, the audio module 120, the direction module 140, a microphone 204, a camera 204, and a network connection 220. The processor 102, the memory 104, the audio module 120, and the direction module 140 may or may not be substantially similar to those depicted in FIG. 1.

In one embodiment, the apparatus 200 includes a microphone and the audio module 120 may receive the audio signal from the microphone. The microphone, as one skilled in the art may appreciate, may convert sound waves to an electronic audio signal and the audio module 120 may receive the electronic audio signal.

In one embodiment, the apparatus 200 includes a camera and the direction module 140 may determine a location where a user's eyes may be directed based on input from the camera 204. In one examples, the camera 204 may be an infrared camera that tracks movement of the user's eyes. In another examples, the camera 204 may capture a series of still images. The direction module 140 may process the still images to determine movement of the user's eyes. In another examples, the direction module 140 may process the still images to track features of the user's eyes as previously described.

In one embodiment, the apparatus 200 includes a network connection 220. In one embodiment, the audio module 120 may receive the audio signal via the network connection. In this embodiment, the audio signal may have already been captured by another devices, and the audio module may receive the captured audio for current processing. In one examples, the audio module 120 may receive the audio signal by loading a file from a remote network server. In another examples, the audio module 120 may receive the audio signal by receiving a data stream over a network.

In another embodiment, the apparatus 100 may transmit data over the network connection 220 to further the purposes of one or more commands issued at the apparatus 100. For example, the apparatus 100 may receive a command to copy data and the apparatus 100 may transmit the indicated data over the network connection 220. Of course, the network connection may be wired, wireless, or other, or the like, as described herein.

Figure 3:
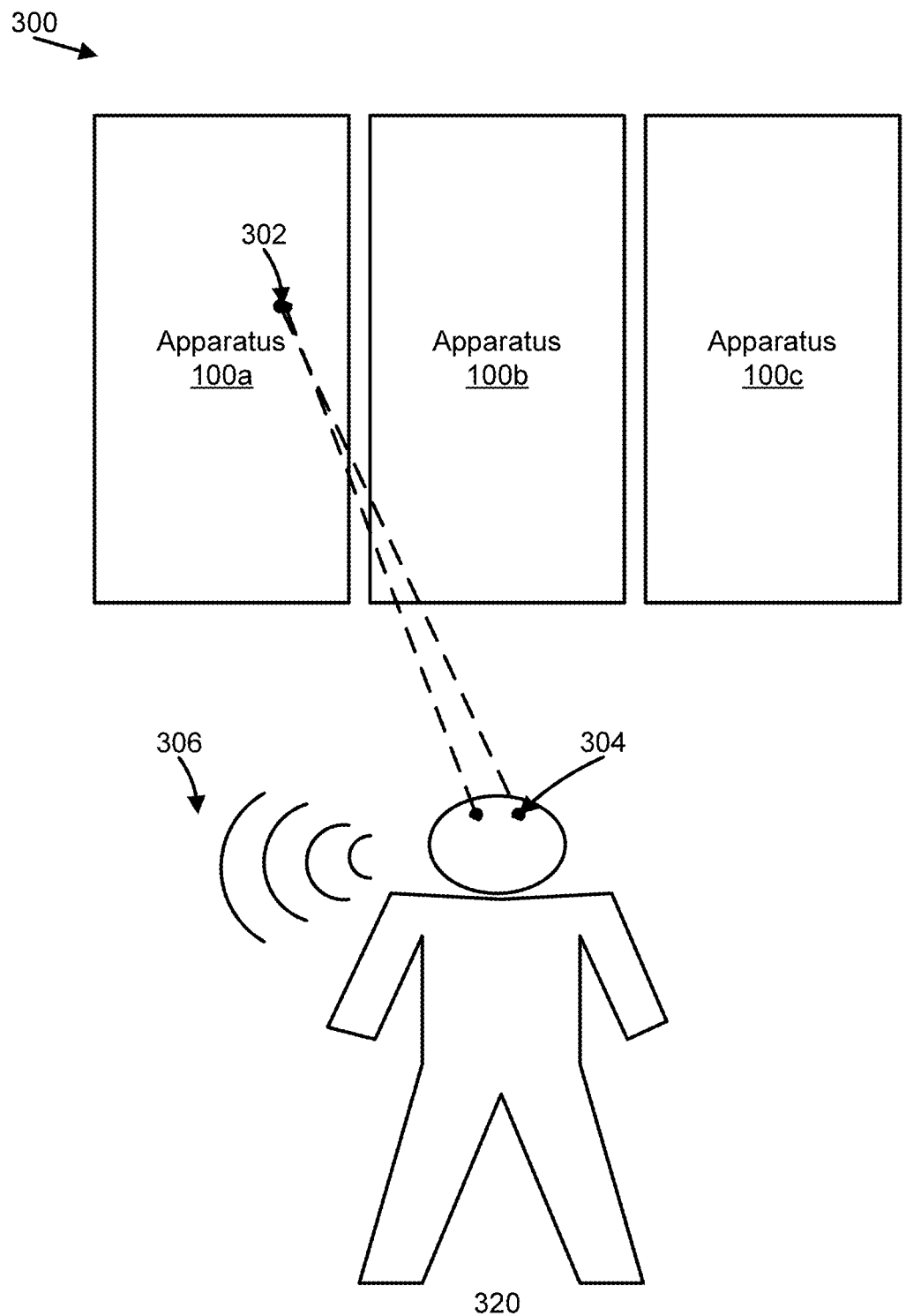
FIG. 3 is an illustration depicting one embodiment of an apparatus according to the present disclosure.

FIG. 3 is an illustration depicting one embodiment of an apparatus according to the present disclosure. In one scenario, a user 320 may be capable of focusing his/her eyes 304 at more than one apparatus 100. The user 320 may focus his/her eyes 304 at any of apparatus 100a, 100b, or 100c. In this scenario, the user 320 may focus his/her eyes 304 on apparatus 100a. The user 320 may issue one or more verbal commands 306. According to an apparatus 100a, 100b, 100c as presently disclosed, apparatus 100a would receive and process the verbal commands, while apparatuses 100b and 100*c* may ignore the verbal commands. Apparatuses 100*b* and 100*c* may ignore the verbal commands because a focal point (or location) for the user's eyes may not be at or near the apparatus 100*b*, 100*c*.

In other examples, the user 320 may speak three commands in sequence. The user may focus on apparatus 100*a* for a first of the three commands, on apparatus 100*b* for a second of the three commands, and apparatus 100*c* for a third of three commands. The first apparatus 100*a* may receive and process the first commands, but may ignore commands two and three. The second apparatus 100*b* may receive and process the second command, but may ignore the first and third commands. The third apparatus 100*c* may receive and process the third command, but may ignore the first and second commands. Therefore, in certain embodiments, a user 320 may control many apparatuses 100*a*, 100*b*, 100*c* based on directing his/her eyes 304 while issuing verbal commands.

Figure 4:
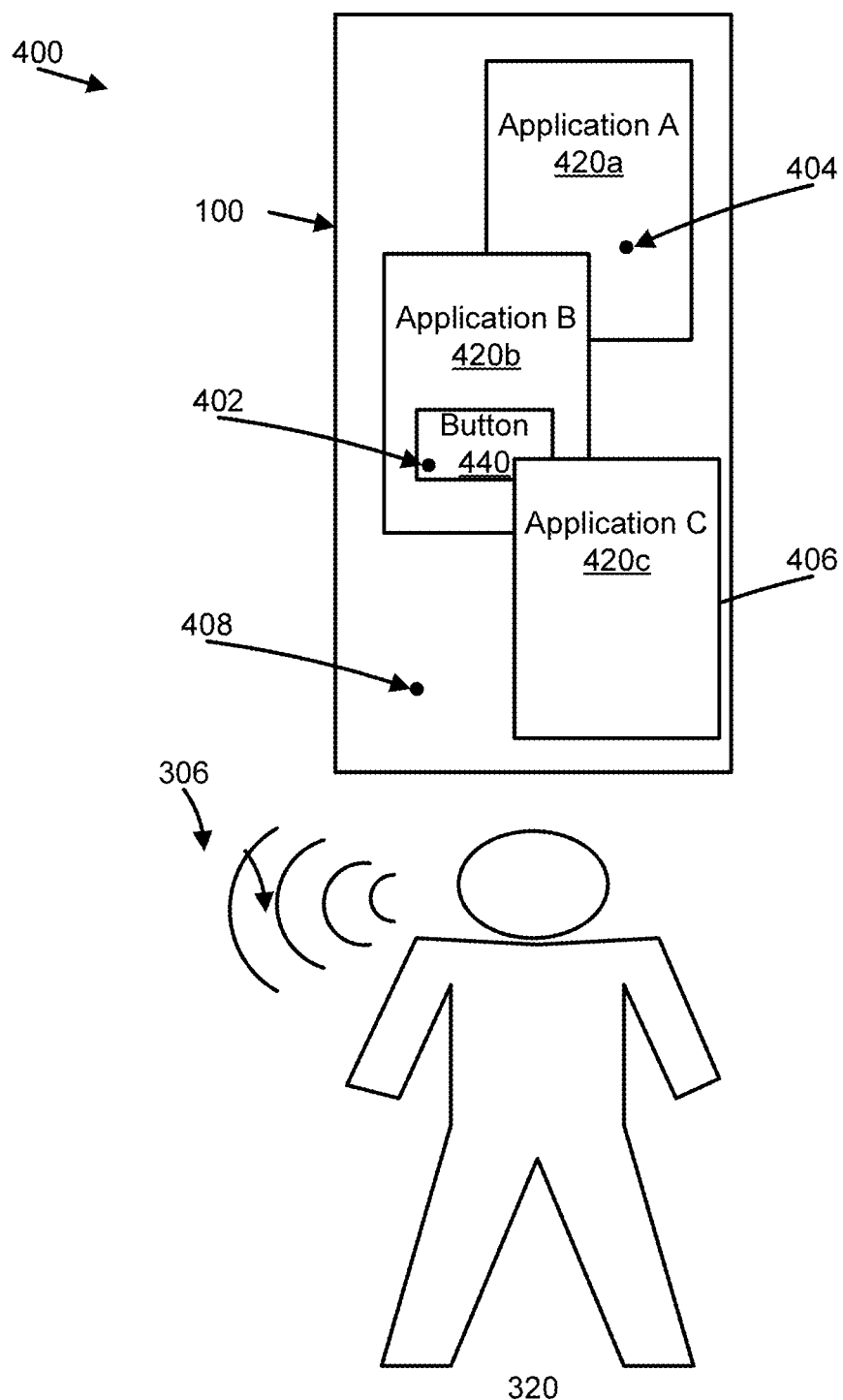
FIG. 4 is an illustration depicting one embodiment of an apparatus according to the present disclosure.

FIG. 4 is an illustration depicting one embodiment of an apparatus according to the present disclosure. According to one embodiment, the apparatus 100 may display several applications 420*a*, 420*b*, 420*c*. A user 320 may direct his/her eyes 304 (FIG. 3) at various locations 402, 404, 406, 408 on a display screen for the apparatus 100. The user 320 may also issue various verbal commands 304 at different times while focusing one of the applications 420*a*, 420*b*, 420*c*.

In one example, the user 320 may focus his/her eyes 304 at location 404 and may issue one or more verbal commands 306. The audio module 120 may receive the verbal commands in an audio signal, the direction module 140 may determine that the user is focused on Application A 420*a* based on a focal point of the user's eyes 304 being at location 404. The direction module 140 may direct the verbal commands or the audio signal to Application A 404. The direction module 140 may direct the verbal commands or the audio signal to Application A 420*a* regardless if Application A is in the foreground of a display for the apparatus 100.

In another example, the user 320 may focus his/her eyes 304 at location 406 and may issue one or more verbal commands 306. The audio module 120 may receive the verbal commands in an audio signal, the direction module 140 may determine that the user is focused on Application C 420*c* based on a focal point of the user's eyes 304 being at location 406. The direction module 140 may direct the verbal commands or the audio signal to Application C 404. The direction module 140 may direct the verbal commands or the audio signal to Application C 420*c* even if Application A is in the foreground of a display for the apparatus 100.

In another example, the user 320 may focus his/her eyes 304 at location 408 and may issue one or more verbal commands 306. The audio module 120 may receive the verbal commands in an audio signal and the direction module may determine that none of applications 420*a*, 420*b*, 420*c* are disposed at the location 408. Therefore, in one example, the direction module may ignore or discard the audio signal or associated commands based on the user 320 not looking at any specific application. This may be the case although the user 320 may focus his/her eyes at the apparatus 100.

In one example, a user may focus on Application A 420*a* and issue a "close" verbal command. The audio module 120 may receive the verbal command. The direction module 140 may direct the audio signal or the command to Application A 420*a* based on Application A 420*a* being disposed on a screen at a location where the user's eyes 304 are directed. In response to directing the command to Application A, the Application A may close.

Of course, this embodiment is not limited to three applications. Many more applications may be displayed via a screen of an apparatus 100. In some examples, 20 or more application may be displayed and the user may select one of the application based on focusing on the application.

In one example, a user may focus on Application B 420*b* at focal point 402 and issue a "click" command. The audio module 120 may receive the command. The direction module 140 may convert the audio signal to a command and direct the command to the Application B 420*b*. The direction module 140 may also include the location of the focal point 402 relative to the application B 420*b*. The Application B 420*b* may receive the command and the location and may determine that the user desires to "click" at that location 402. Therefore, the Application B 420*b* may receive a click or other event for a control, such as, but not limited to a button that may be disposed at the location of the focal point 402.

Of course, the Application B 420*b* may display any number of other controls such as, but not limited to, buttons, slider bars, drop-down boxes, lists, entry fields, labels, other boxes, or other, or the like. The user 320 may activate any of the available controls by focusing on a point that may activate the control and issuing a verbal command. Therefore, this disclosure is not limited regarding the specific activated control.

In another example, a user may focus on point 404 and issue a "copy" command. The user may subsequently focus on point 406 and issue a "paste" command. Accordingly, the audio module may receive the initial "copy" command and the direction module 140 may select Application A based on a user's eyes being focused on point 404. The direction module may direct the "copy" command to the Application A and the Application A may copy information to a clipboard for the apparatus 100. Subsequently, the audio module may receive the "paste" command and the direction module 140 may select the Application C 420*c* because it is disposed at location 406. The direction module 140 may direct the "paste" command to the Application C 420*c* and the Application C 420*c* may paste information from the clipboard of the apparatus 100.

Figure 5A:
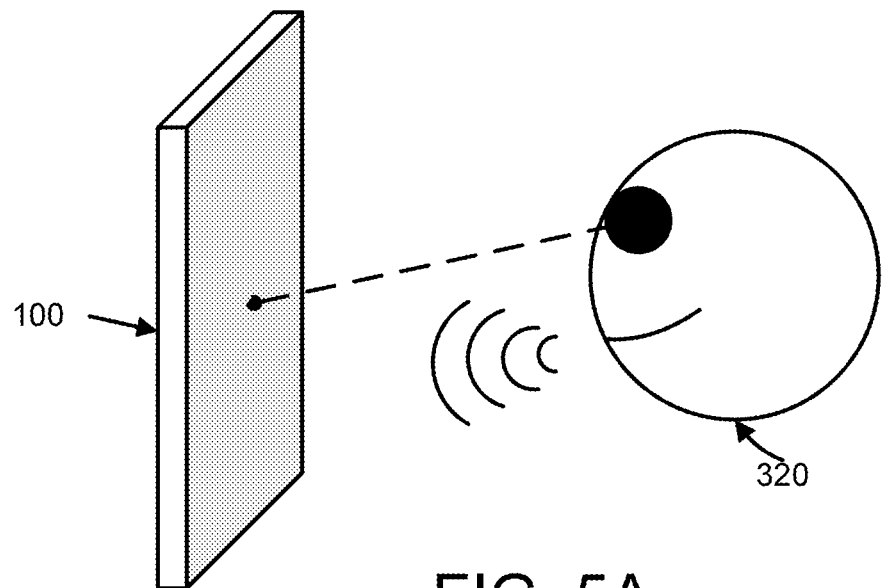
FIG. 5A is an illustration depicting one embodiment of an apparatus according to the present disclosure.

FIG. 5A is an illustration depicting one embodiment of an apparatus according to the present disclosure. In one embodiment, the direction module 140 may use facial recognition to identify the user. In one example, a user 320 may be looking directly at an apparatus 100 and issue one or more voice commands. The direction module 140 may recognize the user based on facial recognition. In response to recognizing the user 320, the direction module 140 may select an application being disposed at a location on a screen for the apparatus where the user's 320 eyes 304 are disposed.

Facial recognition as described herein includes all facial recognition methods, previous methods, current methods, to be developed methods, or other, or the like, as one skilled in the art may appreciate and this disclosure is not limited in this regard.

Figure 5B:
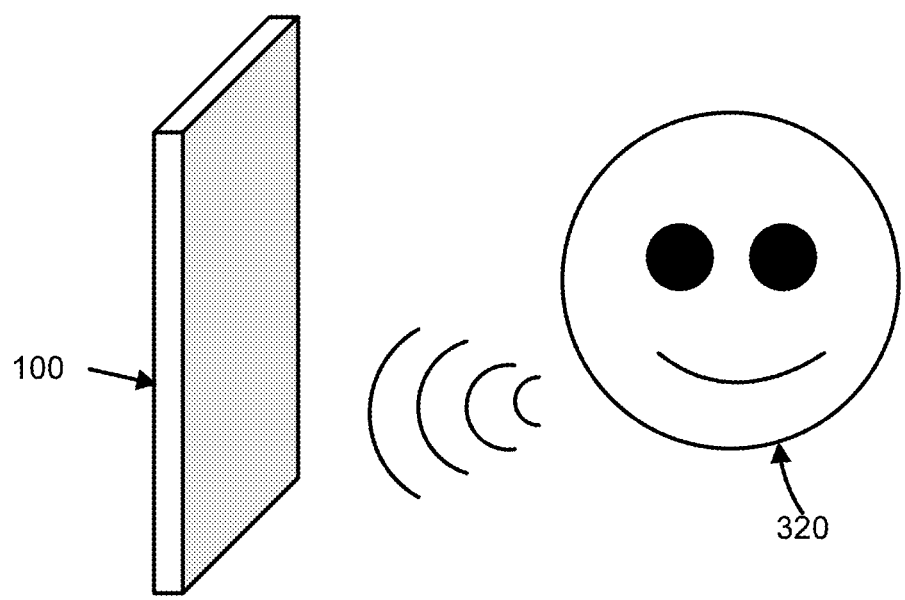
FIG. 5B is an illustration depicting one embodiment of an apparatus according to the present disclosure.

FIG. 5B is an illustration depicting one embodiment of an apparatus according to the present disclosure. In one embodiment, the direction module 140 may use facial recognition to identify the user. In one example, a user 320 may not be looking directly at an apparatus 100 and issue one or more voice commands. The direction module 140 may not recognize the user based on facial recognition, because the user's face may not be visible to the direction module 140.

In response to not recognizing the user 320, the direction module 140 may discard or ignore the audio signal or associated commands.

Figure 6:
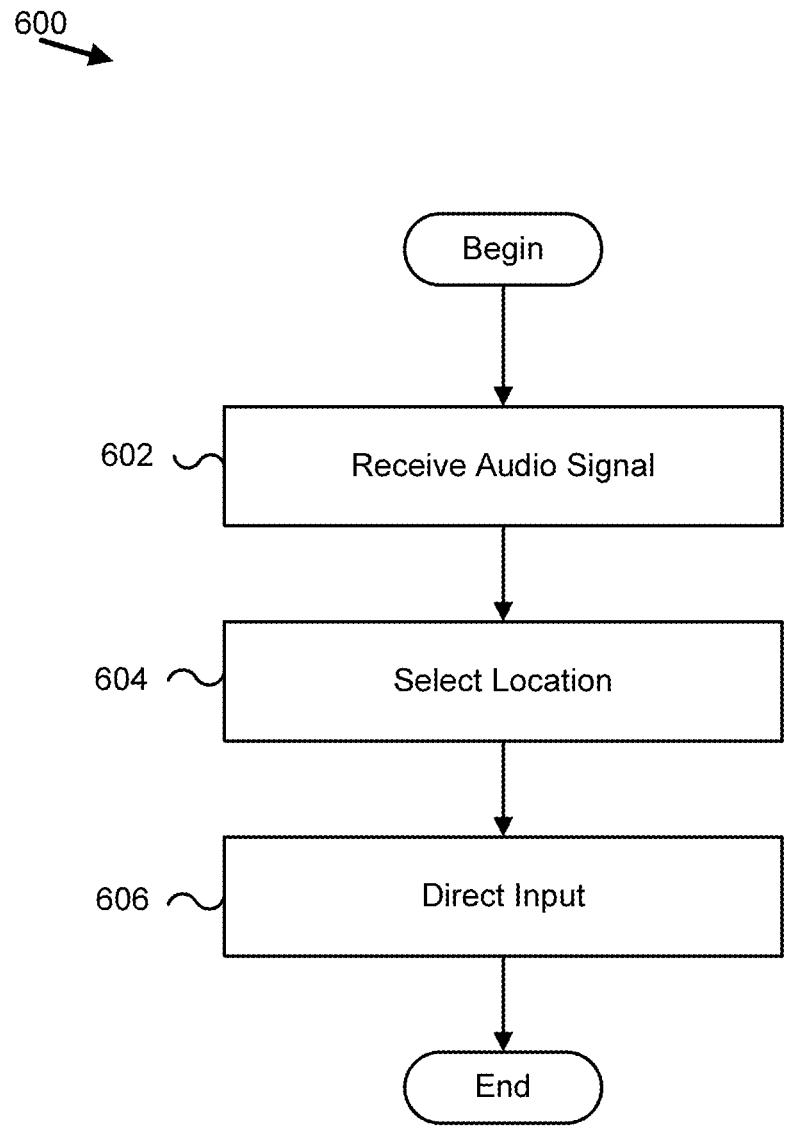
FIG. 6 is a schematic flow chart diagram illustrating one embodiment of a method for directing voice input based on eye tracking.

FIG. 6 is a schematic flow chart diagram illustrating one embodiment of a method 600 for directing voice input based on eye tracking. In one embodiment, the method 600 may begin and the audio module 120 may receive 602 an audio signal. The direction module 140 may select 604 a location based on a focal point of a user's eyes. In one embodiment, the location may include a computing device. In another embodiment, the location may include a location on a screen of a computing devices where an application being displayed may be detected. The direction module 140 may direct 606 the voice input to the selected location and the method 600 may end.

Figure 7:
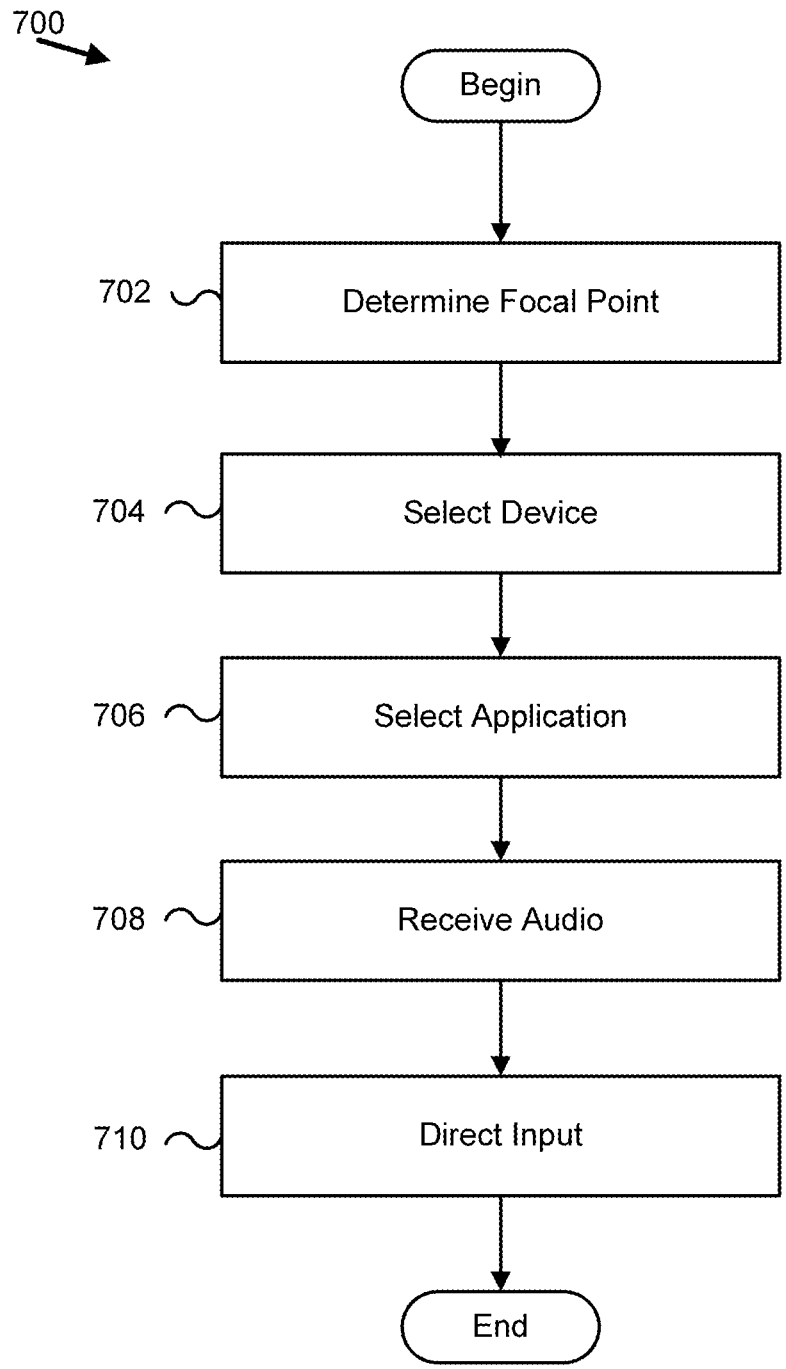
FIG. 7 is a schematic flow chart diagram illustrating one embodiment of a method for directing voice input based on eye tracking.

FIG. 7 is a schematic flow chart diagram illustrating one embodiment of a method 700 for directing voice input based on eye tracking. In one embodiment, the method 700 may begin and the determination module 140 may determine a focal point of the user's eyes based on monitoring reflections of infrared light. In one example, reflections of infrared light from the user's eyes may indicate respective motion of the eyes. The determination module 140 may select 704 an apparatus based on the focal point of the user's eyes being located at the apparatus. The determination module 140 may select 706 an application based on the application being displayed at the location or focal point. The audio module 708 may receive an audio signal. The direction module 140 may direct 710 the audio signal to the selected application and the method 700 may end.

In one embodiment, the directing 710 the input to the application may include transmitting the audio signal to the selected application. In another embodiment, the directing 710 the input to the application may include directing commands represented by the audio signal to the selected application.

Figure 8:
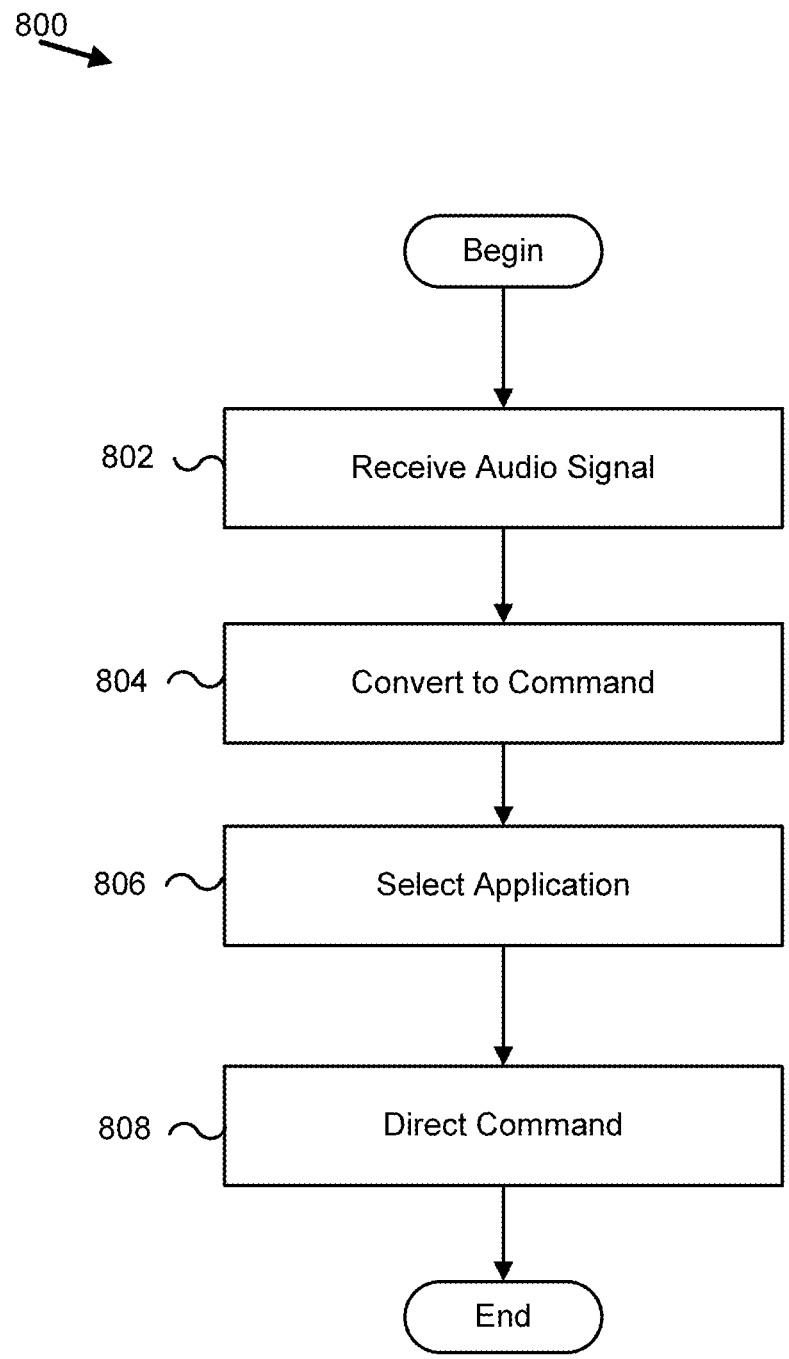
FIG. 8 is a schematic flow chart diagram illustrating one embodiment of a method for directing voice input based on eye tracking.

FIG. 8 is a schematic flow chart diagram illustrating one embodiment of a method 800 for directing voice input based on eye tracking. In one embodiment, the method 800 may begin and the audio module 120 may receive 802 an audio signal. The audio module 120 may convert 804 the audio signal to one or more commands. In another embodiment, the direction module 140 may convert 804 the audio signal to one or more commands. The direction module 140 may select an application disposed on a display where a user's eyes are directed. The direction module 140 may direct 808 the command to the selected application and the method 800 may end. In another embodiment, the command may include the location of a focal point of the user's eyes.

Figure 9:
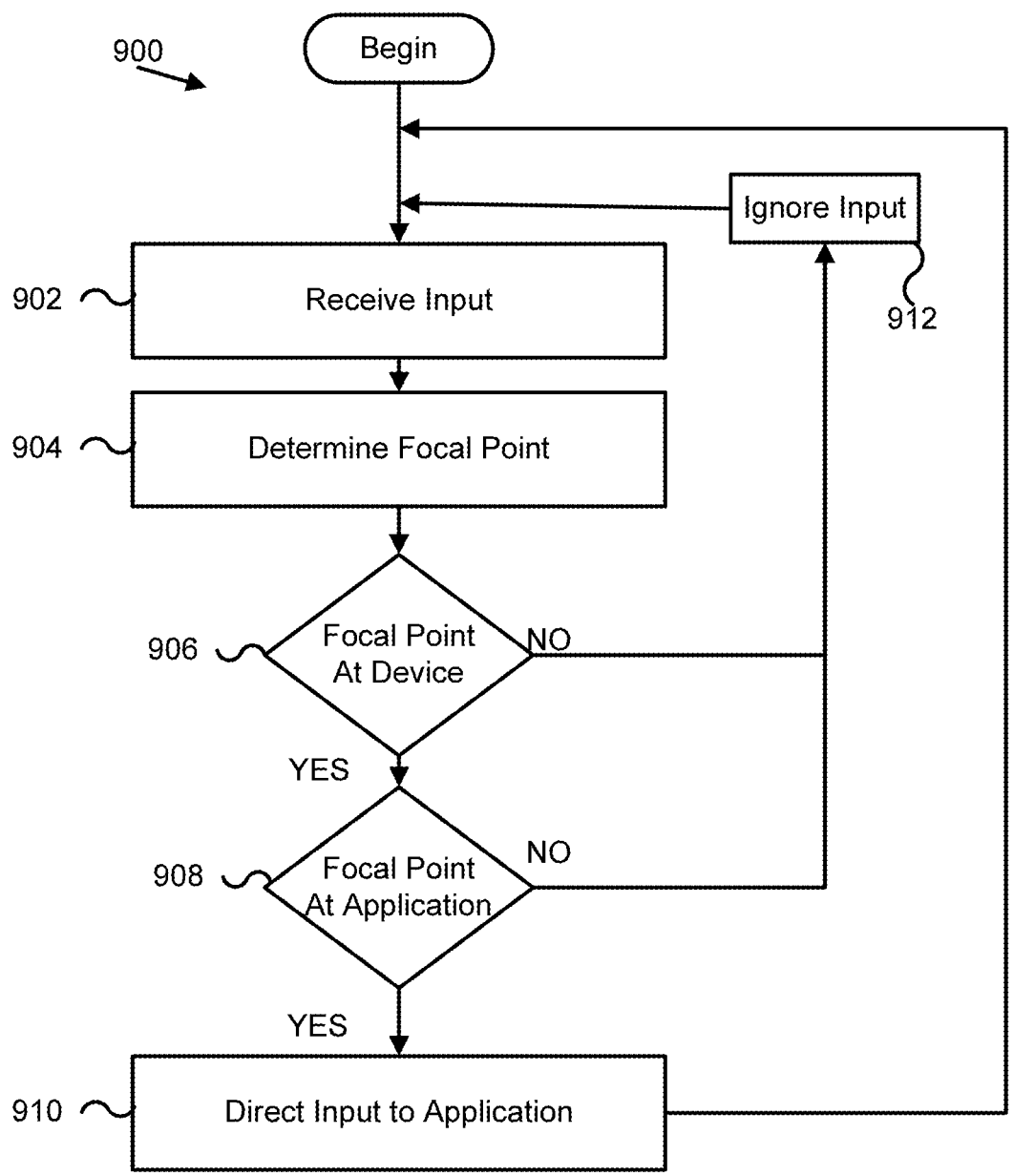
FIG. 9 is a schematic flow chart diagram illustrating one embodiment of a method for directing voice input based on eye tracking.

FIG. 9 is a schematic flow chart diagram illustrating one embodiment 900 of a method for directing voice input based on eye tracking. In one embodiment, the method may begin and the audio module 120 may receive 902 an audio signal. The direction module 140 may determine 904 a focal point of a user's eyes (or a location where a user's eyes are directed). The direction module 140 may determine 906 if the location is at an apparatus 100. If the focal point is not at the apparatus 100, the direction module 140 may ignore 912 the audio signal. If the focal point is at the apparatus 100, the direction module 140 may determine 908 if an application is displayed at the focal point on a screen. If there is no application disposed at the focal point of the user's eyes, the direction module 912 may ignore 912 the audio signal. If there is an application disposed at the focal point, the direction module may direct 910 the audio signal to the application and the method may return to block 902 to receive 902 additional audio input.

Figure 10:
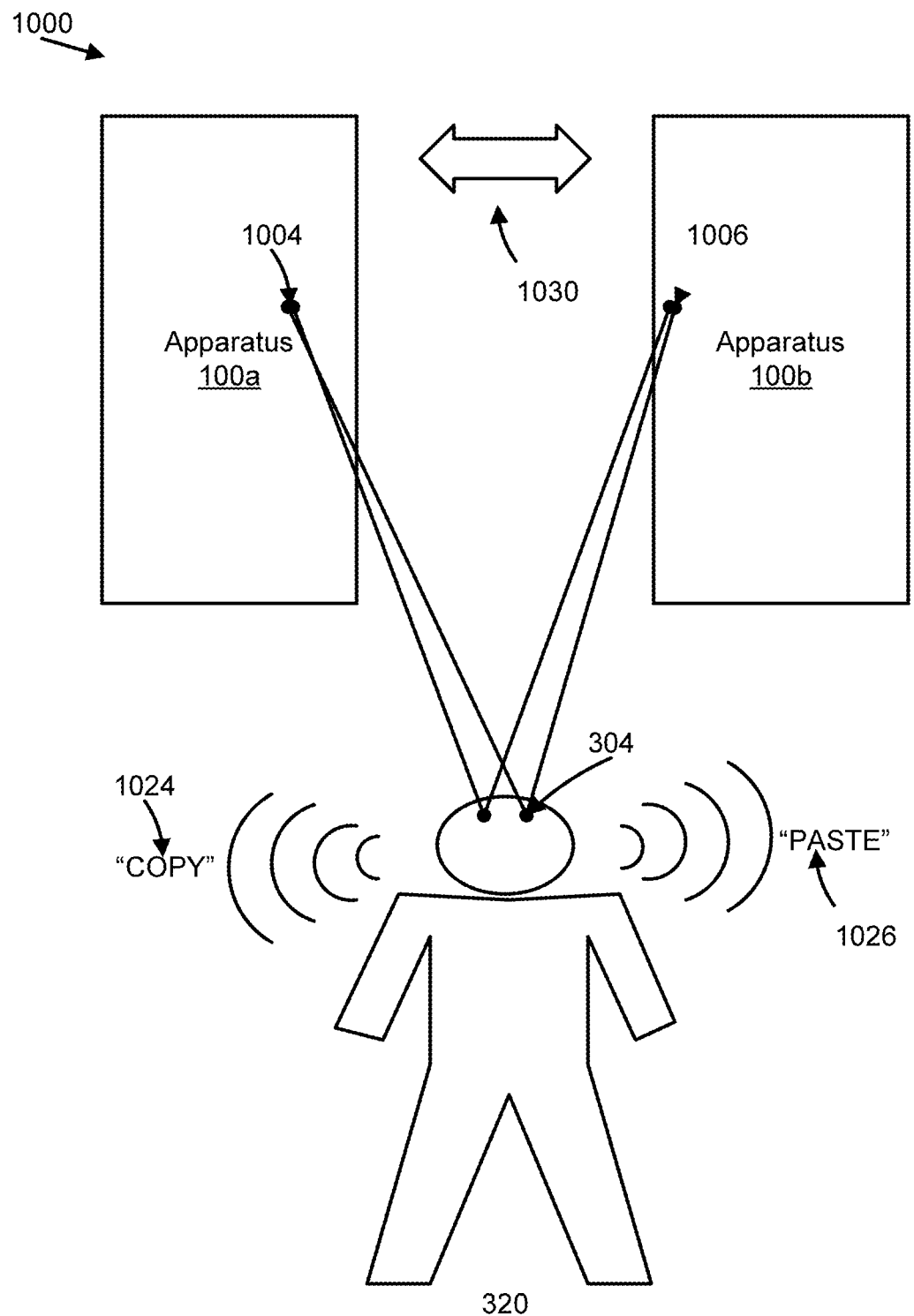
FIG. 10 is an illustration depicting one embodiment of a system according to the present disclosure.

FIG. 10 is an illustration depicting one embodiment of a system according to the present disclosure. In one embodiment, the system 1000 may include two or more apparatuses 100a, 100b as previously described. In one embodiment, the apparatuses 100a, 100b may be associated 1030 with each other.

In one example, the apparatuses 100a, 100b may be preassociated. For example, users of the respective apparatuses 100a, 100b may register their devices with a remote service and may assign the apparatuses 100a, 100b to each other. In another example, the apparatuses 100a, 100b may associate with each other based on a bump. For example, respective apparatuses 100a, 100b may sense a bump based on input from an accelerometer. The apparatuses 100a, 100b may broadcast detection of the bump and include a timestamp with the broadcast. Apparatuses 100a, 100b may receive the broadcast from other devices. Apparatuses 100a or 100b in response to sensing a broadcast indicating a bump from another apparatus 100 that is substantially at the same time as a bump sensed by the apparatus 100a, 100b may establish a connection with the apparatus 100.

Therefore, in certain embodiments, a user initiate voice commands to multiple devices 100a, 100b and the devices 100a, 100b may cooperate in executing the commands. For example, a user 320 may focus his/her eyes 304 on focal point 1004 at device 100a and issue a "copy" command. In preparation of executing the "copy" command the apparatus 100a may copy indicated data to a remote storage.

In one example, the user 320 may focus his/her eyes 304 on focal point 1006 at device 100b and issue a "paste" command. The apparatus 100b may query the remote storage to determine if an associated device had copied any data. If the apparatus 100b discovers that an associated device had copied data, the apparatus 100b may request the copied data. In this manner, a user may copy data from apparatus 100a to apparatus 100b using voice commands and eye focus.

In another example, a user 320 may focus his/her eyes 304 on focal point 1004 at device 100a and issue a "copy" command 1024. In preparation of executing the "copy" command 1024 the apparatus 100a may broadcast available data to copy over the network connection 220. In one example, the user 320 may focus his/her eyes 304 on focal point 1006 at device 100b and issue a "paste" command 1026. The apparatus 100b may determine if another device is broadcasting a "copy" based on the vocal "copy" command 1024. If the apparatus 100b determines that a nearby device 100a is broadcasting a "copy" command, the apparatus 100b may request the copied data from the device 100a over the network connection 220. In another embodiment, the focal point 1006 may indicate an application selected by the direction module 140 to receive the copied data.

In another embodiment, the direction module 140 may periodically scan for other devices 100 that it may associate with. For example, the direction module 140 may be implemented as a service and the service may broadcast an availability signal that may be received by other direction modules 140 executing at other devices 100.

In another embodiment, an established network connection between two or more apparatuses 100 as described herein may be terminated in response to a user's eyes being directed away from devices included in the network. In another embodiment, the network connection 1030 may be terminated after a period of time without use.

In another embodiment, the apparatus 100a may recognize the user 320 based on facial recognition. The user 320 may focus on focal point 1004 and issue a verbal "copy" command to the apparatus 100a. The apparatus may identify the user and upload the copied data to a remote service (including the identification of the user). The user may then focus on focal point 1006 at apparatus 100b and issue a "paste" command. The apparatus 100b may recognize the user and issue a paste request to the remote server (the paste request may also include the identification of the user). The remote service may match the copy request and the paste request based on the identification of the user. Therefore, in certain embodiments, the apparatus 100a and the apparatus 100b may not be associated with each other in any way.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a processor;
    a screen accessible to the processor;
    a memory that stores code executable by the processor, the code comprising:
    code that receives an audio signal, the audio signal comprising voice input;
    code that selects coordinates on the screen, the coordinates being detected where a user's eyes are directed while the audio signal is received;
    code that directs the voice input to an application containing the coordinates;
    code that transmits the coordinates to the application;
    code that performs a command corresponding to the voice input at the coordinates in the application; and
    code that discards the voice input in response to the user's eyes being directed off the screen.

2. The apparatus of claim 1, further comprising code that selects the application based on the application being detected at the coordinates on the screen.

3. The apparatus of claim 1, further comprising code that generates the command based on the voice input, the code directing the command to the coordinates.

4. The apparatus of claim 1, wherein the code employs facial recognition to recognize the face of the user.

5. A method comprising:
    receiving, by use of a processor, an audio signal, the audio signal comprising voice input;
    selecting coordinates on a screen of a computing device, the coordinates being detected where a user's eyes are directed while the audio signal is received;
    converting the voice input to a command;
    directing the command to an application containing the coordinates;
    performing the command at the coordinates in the application; and
    discarding the voice input in response to failing to select an application.

6. The method of claim 5, further comprising selecting the application at the coordinates on the screen.

7. The method of claim 5, wherein selecting the coordinates comprises using facial recognition to identify the user.

8. A program product comprising a non-transitory computer readable storage medium that stores code executable by a processor to perform:
    receiving, by use of a processor, an audio signal, the audio signal comprising voice input;
    selecting coordinates on a screen of a computing device, the coordinates being detected where a user's eyes are directed while the audio signal is received;
    converting the voice input to a command;
    directing the command to an application containing the coordinates;
    performing the command at the coordinates in the application; and
    discarding the voice input in response to failing to select an application.

9. The program product of claim 8, wherein the code further selects the application based on the application being detected at the coordinates on the screen.

10. The program product of claim 8, wherein directing the command comprises transmitting the audio signal to the coordinates.

11. The program product of claim 8, wherein selecting the coordinates comprises using facial recognition to identify the user.

* * * * *